Patented Sept. 13, 1938

2,129,993

UNITED STATES PATENT OFFICE 2,129,993

ANTHRAQUINONOYL AMINOANTHRAQUINONES

Joseph Deinet, Milwaukee, Wis., assignor to E. I. du Pont de Nemours & Company, Wilmington, Del., a corporation of Delaware No Drawing. Application July 6, 1937, Serial No. 152,146

2 Claims. (Cl. 260—368)

This invention relates to the preparation of new and useful vat dyestuffs and intermediates of the anthraquinone series and more particularly to the preparation of new anthraquinonoylaminoanthraquinone compounds containing the nucleus

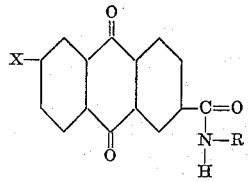

wherein R stands for an anthraquinone compound including heterocyclic substituted anthraquinones attached to the —N— in an alpha position, and wherein X stands for halogen or an anthraquinonylamino radical.

It is recognized that in general the vat dyestuffs of the anthraquinone series exhibit improved fastness properties over many of the earlier dyestuffs. While dyestuffs of a large variety of shades have been produced in the anthraquinone series, a diligent search is still being carried out in an endeavor to find new red dyestuffs of this series which will exhibit the usual fastness properties generally attributed to this class of dyestuffs. In the preparation of dyestuffs from the anthraquinone molecule, the use of beta-beta-substituted anthraquinones has generally been avoided, for many compounds of the anthraquinone series carrying the active substituents in the beta-beta position when substituted by groups which ordinarily would form compounds having good dyeing properties were found to have very poor tinctorial power. Several alpha-beta-substituted anthraquinone compounds have been found to be valuable and a number of dyestuffs have been prepared therefrom. I have now found that new and very valuable dyestuffs can be prepared from 2-halogen-6-anthraquinone carbonyl chloride when the same is condensed with amino compounds of the anthraquinone series including the heterocyclic substituted anthraquinone compounds such as the anthrapyridones, anthrapyrimidines, and anthraquinonebenzacridones, and that these dyestuffs dye in shades ranging from orange-red and red to deep purple.

In the preparation of this new class of dyestuffs, one molecule of an aminoanthraquinone compound as above defined is first condensed with the acid chloride group of the 2-chloro-6-anthraquinone acid chloride. The remaining chlorine in the 2-position is then substituted by one molecule of the same or different aminoanthraquinone compound. Where the amine condensed with the acid chloride group is an alpha-alpha-diamine, either one or two molecules of the 2-chloro-6-anthraquinone carbonyl chloride may be employed. In the second case this gives a dianthraquinonoyldiaminoanthraquinone carrying in the end anthraquinone nuclei reactive halogen groups which may then be further condensed with aminoanthraquinone compounds to give valuable orange-red to purple dyestuffs.

Where the first aminoanthraquinone condensed with the carbonyl halide group of the 2-chloro-6-anthraquinone carbonyl halide also carries a reactive halogen group, further condensation with aminoanthraquinone compounds may be effected as more particularly illustrated in the following examples. These dyestuffs all exhibit excellent fastness properties and have exceptionally high tinctorial power. They exhaust well and may be dyed from either a warm or cold vat. The following examples are given to illustrate this invention more fully. The parts used are by weight.

Example 1

400 parts of o-dichlorobenzene, 33 parts of 2-chloroanthraquinone-6-carboxylic acid chloride and 26 parts of 1-amino-6-chloroanthraquinone are slowly heated under agitation to 175–177° C. and held for 1 hour, cooled to 25° C., filtered, washed with alcohol and dried. The resulting product has the formula

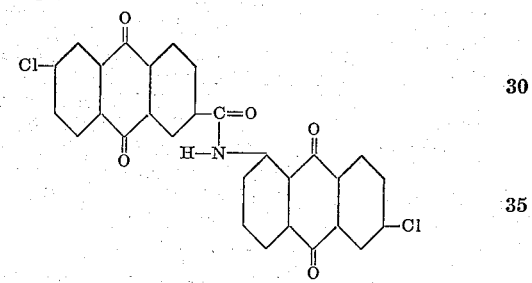

This compound exhibits dye properties, dyeing cotton from a brown vat in yellow shades. It is a valuable intermediate for the preparation of other dyestuffs, as more fully illustrated in the following examples.

Example 2

17.5 parts of the product of Example 1, 400 parts of naphthalene, 19 parts of 1-aminoanthraquinone, 10 parts of sodium carbonate, and 1.5 parts of copper acetate are heated together while agitating to 212–215° C., and held at that temperature for 10 hours, cooled to 150° C., diluted with 600 parts of o-dichlorobenzene, filtered at 50° C., washed with o-dichlorobenzene, alcohol, and hot water in turns and dried.

The product obtained dyes cotton from a red-brown vat in strong orange-red shades which exhibit excellent fastness to washing, bleach and light.

Example 3

300 parts of naphthalene are heated to 100° C.

and while agitating, 13 parts of condensation product of 2-chloroanthraquinone-6-carboxylic acid chloride + 1-amino-6-chloroanthraquinone of Example 1, 17 parts of 1-amino-5-benzoylaminoanthraquinone, 6.5 parts of sodium carbonate and 1.5 parts of copper acetate are added. The mass is heated to 212–215° C. and agitated at this temperature for 12 hours, cooled to 150° C., diluted with 450 parts of o-dichlorobenzene, filtered at 50° C., washed with o-dichlorobenzene, alcohol and hot water in turns and dried.

The product obtained dyes cotton from a dull reddish brown vat in strong red shades (bluish cast) of very good fastness properties.

Example 4

500 parts of nitrobenzene, 46 parts of 2-chloroanthraquinone-6-carboxylic acid chloride and 30 parts of 1-aminoanthraquinone are heated together, while agitating, to 180° C. and held for 10 minutes, cooled to 25° C., filtered, washed with alcohol and dried.

450 parts of naphthalene are heated to 100° C. and, while agitating, 54 parts of the above obtained condensation product, 23 parts of 1-aminoanthraquinone, 25 parts of sodium carbonate and 1.5 parts of copper acetate are added, heated to 212–215° C., and agitated at that temperature for 12 hours. It is then cooled to 150° C., diluted with 600 parts of o-dichlorobenzene, filtered at 50° C., washed with o-dichlorobenzene, alcohol and hot water in turns and dried.

The product obtained dyes cotton from a red-brown vat in strong orange-red shades of very good fastness properties.

Example 5

300 parts of naphthalene are heated to 100° C. and, while agitating, 13 parts of the condensation product of 2-chloroanthraquinone-6-carboxylic acid chloride+1-amino-6-chloroanthraquinone of Example 1, 17 parts of 1-amino-4-benzoylaminoanthraquinone, 6.5 parts of sodium carbonate and 1.5 parts of copper acetate are added, heated to 212–215° C. and agitated at this temperature for 10 hours, cooled to 150° C., diluted with 450 parts of o-dichlorobenzene, filtered at 50° C., washed with o-dichlorobenzene, alcohol and hot water in turns and dried.

The product obtained dyes cotton from a dark reddish brown vat in violet shades (brownish cast) of good fastness properties.

Example 6

250 parts of naphthalene are heated to 100° C. and, while agitating, 15 parts of condensation product of 2-chloroanthraquinone-6-carboxylic acid chloride+1 - amino-6-chloroanthraquinone of Example 1, 15 parts of 1-amino-4-methoxyanthraquinone, 10 parts of sodium carbonate and 1 part of copper acetate are added, heated to 212–215° C. and agitated at this temperature for 8 hours. The mass is then cooled to 150° C., diluted with 375 parts of o-dichlorobenzene, filtered at 50° C., washed with o-dichlorobenzene, alcohol and hot water in turns and dried.

The product obtained dyes cotton from a red-brown vat in strong violet shades of good fastness properties.

Example 7

400 parts of naphthalene are heated to 100° C. and, while agitating, 17.5 parts of condensation product of 2-chloroanthraquinone-6-carboxylic acid chloride+1 - amino-6-chloroanthraquinone of Example 1, 18.4 parts of 4-amino-1,9-N-methylanthrapyridone, 10 parts of sodium carbonate and 0.7 part of copper powder are added, heated to 212–215° C. and agitated at this temperature for 10 hours. The mass is then cooled to 150° C., diluted with 600 parts of o-dichlorobenzene, filtered at 60° C., washed with o-dichlorobenzene, alcohol and hot water in turns and dried.

The obtained product dyes cotton from a vat in very strong purple-red shades of very good fastness properties.

Example 8

800 parts of nitrobenzene, 20 parts of 1,5-diaminoanthraquinone and 53 parts of 2-chloroanthraquinone-6-carboxylic acid chloride are slowly heated while agitating to 205° C., and held for 15 minutes, cooled to 100° C., filtered, washed with nitrobenzene, alcohol, and dried. 350 parts of naphthalene are heated to 100° C. and, while agitating, 15 parts of above condensation product, 12 parts of 4-amino-1,9-N-methylanthrapyridone, 10 parts of sodium carbonate and 0.5 part of copper powder are added. The mass is heated to 212–215° C. under agitation and held for 12 hours. It is then cooled to 150° C., diluted with 475 parts of o-dichlorobenzene, filtered at 60° C., washed with o-dichlorobenzene, alcohol and hot water in turns and dried.

The product obtained dyes cotton from a vat in strong red shades (blue cast) of good fastness properties.

Example 9

300 parts of naphthalene are heated to 100° C. and, while agitating, 15 parts of the condensation product of 1,5-diaminoanthraquinone+2-chloroanthraquinone-6-carboxylic acid chloride of Example 8, 10 parts of 1-aminoanthraquinone, 10 parts of sodium carbonate and 0.5 part of copper powder are added. The mass is heated to 212–215° C. and agitated at this temperature for 12 hours. It is then cooled to 150° C., diluted with 450 parts of o-dichlorobenzene and filtered at 60° C., washed with o-dichlorobenzene and alcohol and hot water in turns, and dried.

The product so obtained dyes cotton from a vat in strong orange-red shades of very good fastness properties.

Other aminoanthraquinone compounds may be substituted for those specifically mentioned in the above examples, such as 1-amino-4-methylaminoanthraquinone; 1-amino-4- or 5-nitroanthraquinone; 1,4 - diaminoanthraquinone; 1-amino-4-, 5- or 8-benzoylaminoanthraquinone; 4- or 5-amino-1,9-N-methylanthrapyridone; 4-, 5- or 8-aminoanthraquinone-2,1-N-benzacridone; 4- or 5-amino-1,9-anthrapyrimidine; 1-amino-4-, 5- or 8-hydroxyanthraquinone; 1-amino-4, 5- or 8-alkoxyanthraquinone such as 1-amino-4-, 5- or 8-methoxyanthraquinone and its higher homologues; 1-amino-4-, 5- or 8-chloroanthraquinone.

The above mentioned aminoanthraquinones are also illustrative of the type of amines which may be used in the second condensation with the 2-halogen of the 2-halogen-6-anthraquinone carbonyl halide radical and with any other halogen group of the amino compound which has been condensed therewith. Where the aminoanthraquinone condensed to the carbonyl group of the 2-halogen-6-anthraquinone carbonyl halide contains alpha-halogen, the alpha-halogen should be condensed with a beta-aminoanthraquinone compound or otherwise protected before the 2-halogen of the 2-halogen-6-anthraquinone carbonyl halide is further condensed with an alpha-aminoanthraquinone, for it is preferred that the molecule does not contain an alpha-alpha-anthrimide linkage.

It will be noted that the particular nucleus of the dyestuff illustrated in the above examples which imparts to the molecule the property of dyeing in red shades is the 2-halogen-anthraquinone-6-carbonyl halide condensed with alpha-aminoanthraquinones in both the 2 and 6 positions. The particular substituents added to that nucleus merely change the shade of red from the yellow to the blue side, depending on the particlar characteristics of the substituent present.

It is to be understood that the above examples and list of aminoanthraquinone compounds are given merely to illustrate my invention and are not to be considered as limitations thereupon, and that the present invention covered by the claims of this application contemplates the preparation of dyestuffs containing the nucleus

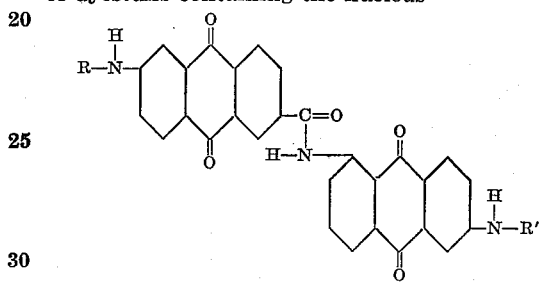

wherein R and R' stand for radicals of the anthraquinone series including heterocyclic substituted anthraquinone groups attached to the —N— in an alpha position.

Divisional application Serial No. 177,051, filed November 29, 1937, covers the intermediate condensation products disclosed in the above specification.

I claim:
1. Anthraquinonoylaminoanthraquinone dyestuffs of the general formula

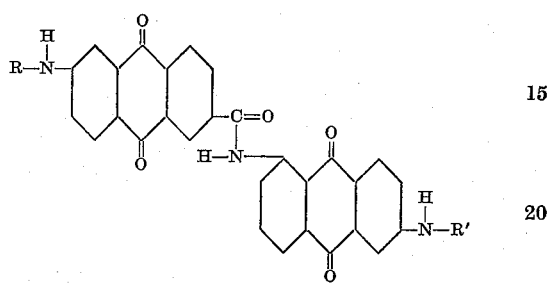

wherein R and R' stand for radicals of the anthraquinone series which are attached to the N atom in an alpha position, which dye cotton in orange-red, and red to deep purple shades.

2. The dyestuff of the formula

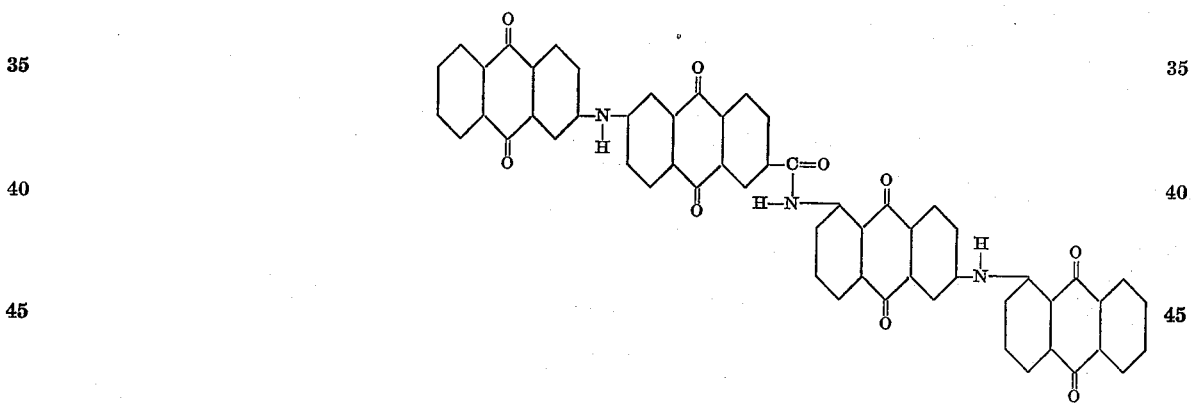

which dyes cotton from a red-brown vat in strong orange-red shades.

JOSEPH DEINET.